(12) United States Patent
Kocjan et al.

(10) Patent No.: US 8,847,985 B2
(45) Date of Patent: *Sep. 30, 2014

(54) PROTECTING SCREEN INFORMATION

(75) Inventors: Wojciech Kocjan, Rybnik (PL); Piotr Beltowski, Krakow (PL); Rossella De Gaetano, Rome (IT); David Warren Knapp, Jr., Piaseczno (PL)

(73) Assignee: International Business Machines Corporation, Armonk, NY (US)

( * ) Notice: Subject to any disclaimer, the term of this patent is extended or adjusted under 35 U.S.C. 154(b) by 575 days.

This patent is subject to a terminal disclaimer.

(21) Appl. No.: 12/982,567

(22) Filed: Dec. 30, 2010

(65) Prior Publication Data

US 2012/0169762 A1 Jul. 5, 2012

(51) Int. Cl.
*G09G 5/00* (2006.01)
*G06F 21/62* (2013.01)

(52) U.S. Cl.
CPC ...... *G06F 21/6209* (2013.01); *G06F 2221/032* (2013.01)
USPC .............................................. 345/629; 726/1

(58) Field of Classification Search
CPC ................ G09G 5/14; G09G 2340/10; G09G 2340/125; G06T 11/60; G06T 15/503
See application file for complete search history.

(56) References Cited

U.S. PATENT DOCUMENTS

| | | | |
|---|---|---|---|
| 7,478,436 B1 | 1/2009 | Shieh et al. | |
| 2002/0032677 A1 | 3/2002 | Morgenthaler et al. | |
| 2003/0107584 A1 | 6/2003 | Clapper | |
| 2005/0066165 A1* | 3/2005 | Peled et al. | 713/165 |
| 2006/0250834 A1* | 11/2006 | Chinn et al. | 365/63 |
| 2008/0196046 A1* | 8/2008 | Athas et al. | 719/320 |
| 2008/0208579 A1 | 8/2008 | Weiss et al. | |
| 2008/0222573 A1* | 9/2008 | Abeckaser | 715/856 |
| 2008/0235339 A1 | 9/2008 | Lurey et al. | |
| 2009/0031227 A1 | 1/2009 | Chakrabarti et al. | |
| 2009/0177764 A1* | 7/2009 | Blatherwick et al. | 709/221 |
| 2010/0024028 A1 | 1/2010 | Baugher et al. | |
| 2010/0070842 A1 | 3/2010 | Aymeloglu et al. | |

(Continued)

FOREIGN PATENT DOCUMENTS

| | | |
|---|---|---|
| CN | 101470787 | 7/2009 |
| WO | 2010700490 | 6/2010 |

OTHER PUBLICATIONS

Hussain et al., "No-Capture Hardware Feature for Securing Sensitive Information," ITCC International Conference, vol. 1, Apr. 4-6 2005, pp. 697-702.

(Continued)

*Primary Examiner* — Kee M Tung
*Assistant Examiner* — Michelle Chin
(74) *Attorney, Agent, or Firm* — Holland & Knight LLP; Brian J. Colandreo, Esq.; Jeffrey T. Placker, Esq.

(57) ABSTRACT

A method, computer program product, and system for protection screen information is described. A method may comprise determining, via a computing device, if there is a screen protection rule, the screen protection rule based upon, at least in part, at least one of an application rule for protecting a portion of a screen region, and a process rule for protecting the portion of the screen region. The method may further comprise modifying, via the computing device, the portion of the screen region based upon, at least in part, at least one of the application rule, and the process rule.

13 Claims, 10 Drawing Sheets

(56) References Cited

U.S. PATENT DOCUMENTS

2010/0205667 A1* 8/2010 Anderson et al. ............... 726/19
2010/0257450 A1  10/2010 Go et al.
2010/0262925 A1  10/2010 Liu et al.

OTHER PUBLICATIONS

IBM et al., "Method and Apparatus for the Automatic Update of Screenshot Images," IPCOM000181814D, Apr. 14, 2009.

* cited by examiner

Screenshot Protection Rules Database 300

| Rule | Modification |
|---|---|
| Process Rule – Email Application | Minimize Email Message Window |
| Application Rule – Web Browser Application | Regenerate Window without Bookmarks |
| Application Rule – Web Browser Application | Regenerate Window without Tabs |
| Process Rule – Web Browser Application | Obfuscate Image |
| Process Rule – Spreadsheet Application | Remove Object in Spreadsheet |
| Process Rule – Picture and Fax Viewing Application | Obfuscate Image Name with Bounding Box |
| Process Rule – Desktop | Obfuscate Visible Desktop |
| Process Rule – Task Bar | Obfuscate Visible Task Bar |

PROTECTING SCREEN INFORMATION

BACKGROUND OF THE INVENTION

Information on a computer screen may be visible if left unprotected. Some of this information may not be public. Further, when making a screenshot of the computer screen, information that is not public may be included in the screenshot. Some of this information may include bookmarks, open tabs in a web browser, and confidential information in an email. Users may take a screenshot and edit it to remove non-public information prior to making the screenshot available.

BRIEF SUMMARY OF THE INVENTION

In a first embodiment, a method may include determining, via a computing device, if there is a screen protection rule, the screen protection rule based upon, at least in part, at least one of an application rule for protecting a portion of a screen region, and a process rule for protecting the portion of the screen region. The method may further include modifying, via the computing device, the portion of the screen region based upon, at least in part, at least one of: the application rule, and the process rule.

One or more of the following features may be included. The method may include determining if the screen region is visible. At least one of the determining if there is a screen protection rule, and the modifying the portion of the screen region, may be performed in response to a request for a screenshot. Modifying the portion of the screen region may include regenerating the screen region based upon, at least in part, the application rule. Modifying the portion of the screen region may further include sending a request to an application based upon, at least in part, the process rule.

In some implementations, modifying the portion of the screen region may include obfuscating the portion of the screen region based upon, at least in part, the process rule. Modifying the portion of the screen region may further include removing an object from the screen region. The method may further include defining at least one of the application rule, and the process rule. The screen region may include a window. Modifying the portion of the screen region may also include minimizing the window.

In a second embodiment, a computer program product may reside on a computer readable storage medium and may have a plurality of instructions stored on it. When executed by a processor, the instructions may cause the processor to perform operations including determining if there is a screen protection rule, the screen protection rule based upon, at least in part, at least one of an application rule for protecting a portion of a screen region, and a process rule for protecting the portion of the screen region. The operations may further include modifying the portion of the screen region based upon, at least in part, at least one of the application rule, and the process rule.

One or more of the following features may be included. The operations may include determining if the screen region is visible. At least one of the determining if there is a screen protection rule, and the modifying the portion of the screen region, may be performed in response to a request for a screenshot. Modifying the portion of the screen region may include regenerating the screen region based upon, at least in part, the application rule. Modifying the portion of the screen region may further include sending a request to an application based upon, at least in part, the process rule.

In some implementations, modifying the portion of the screen region may include obfuscating the portion of the screen region based upon, at least in part, the process rule. Modifying the portion of the screen region may further include removing an object from the screen region. The operations may further include defining at least one of the application rule, and the process rule. The screen region may include a window. Modifying the portion of the screen region may also include minimizing the window.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to determine if there is a screen protection rule, the screen protection rule based upon, at least in part, at least one of: an application rule for protecting a portion of a screen region, and a process rule for protecting the portion of the screen region. Further, the computing system may include a second software module configured to modify the portion of the screen region based upon, at least in part, at least one of the application rule, and the process rule.

One or more of the following features may be included. The computing system may also include a third software module configured to determine if the screen region is visible. At least one of the first software module configured to determine if there is a screen protection rule, and the second software module configured to modify the portion of the screen region, may be configured to be executed in response to a request for a screenshot. The computing system may additionally include a fourth software module that may be configured to regenerate the screen region based upon, at least in part, the application rule. The second software module, which may be configured to modify the portion of the screen region, may be further configured to send a request to an application based upon, at least in part, the process rule.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 3 is an exemplary database which may be associated with the screen information protection process of FIG. 1;

DETAILED DESCRIPTION OF THE INVENTION

Figure 1:
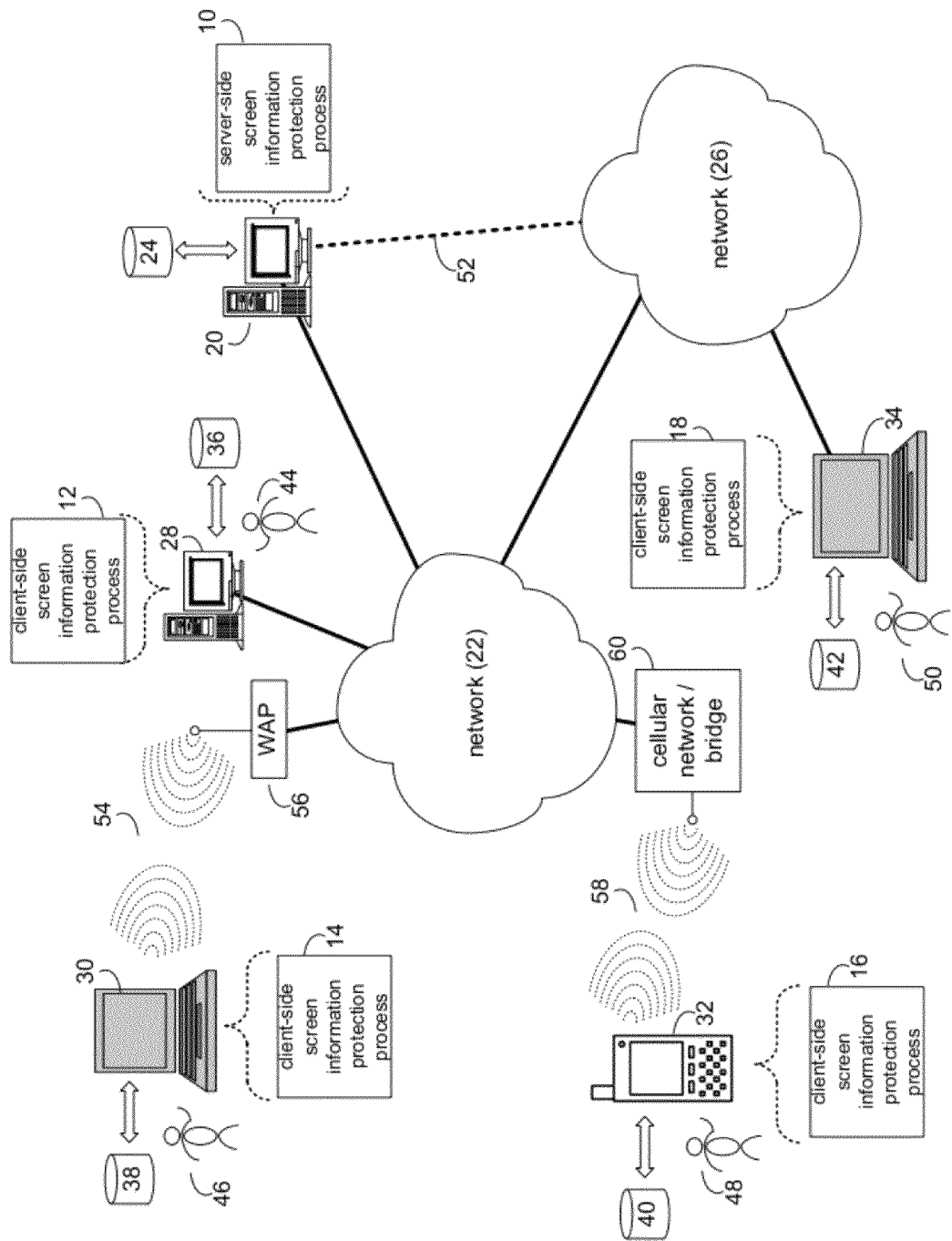
FIG. 1 is a diagrammatic view of a screen information protection process coupled to a distributed computing network.
Figure 2:
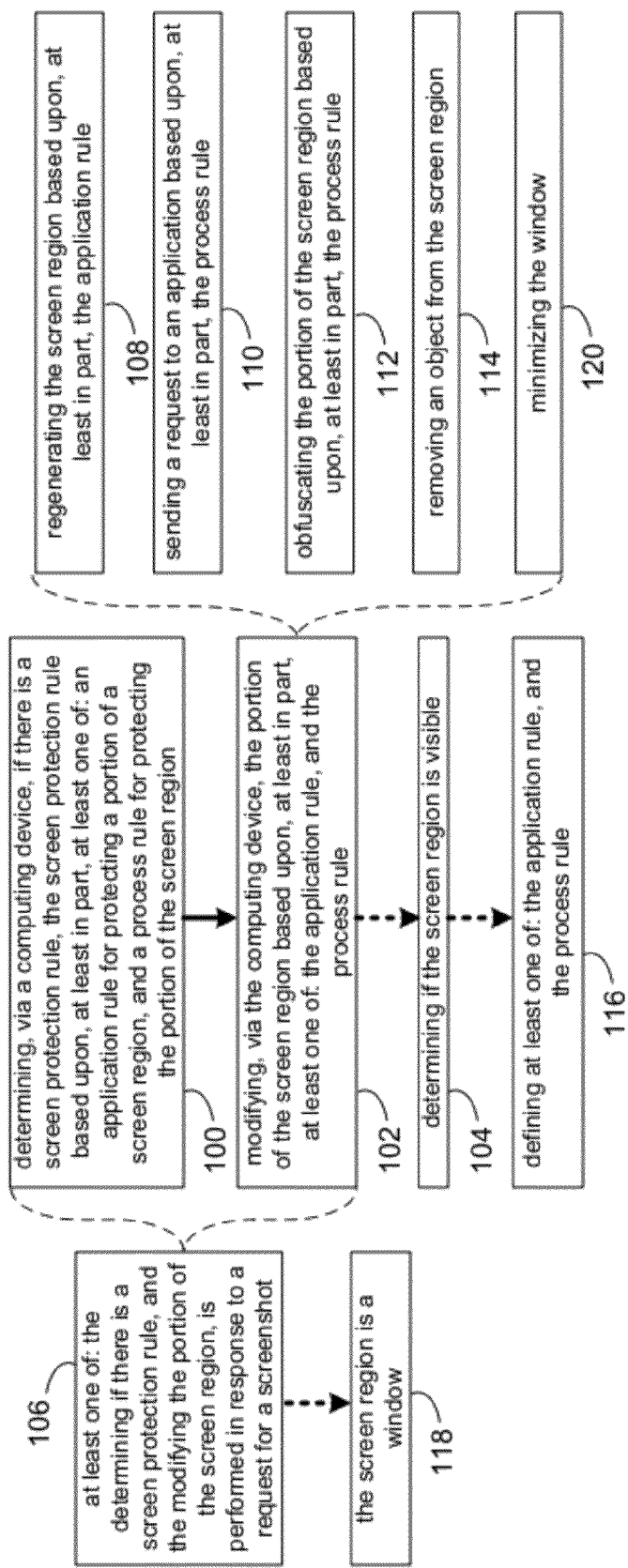
FIG. 2 is a flowchart of the screen information protection process of FIG. 1.

Referring to FIGS. 1 & 2, there is shown a screen information protection process 10. As will be discussed below, screen information protection process 10 may determine 100 if there is a screen protection rule. The screen protection rule may be based upon, at least in part, at least one of an application rule for protecting a portion of a screen region, and a process rule for protecting the portion of the screen region. Screen information protection process 10 may also modify 102 the portion of the screen region based upon, at least in part, at least one of the application rule, and the process rule.

The screen information protection (SIP) process may be a server-side process (e.g., server-side SIP process 10), a client-side process (e.g., client-side SIP process 12, client-side SIP process 14, client-side SIP process 16, or client-side SIP process 18), or a hybrid server-side/client-side process (e.g., the combination of server-side SIP process 10 and one or more of client-side SIP processes 12, 14, 16, 18).

Server-side SIP process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side SIP process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side SIP processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side SIP processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side SIP processes 12, 14, 16, 18 and/or server-side SIP process 10 may be processes that run within (i.e., are part of) an operating system, such as, for example, Microsoft® Windows®. Alternatively, client-side SIP processes 12, 14, 16, 18 and/or server-side SIP process 10 may be stand-alone applications that work in conjunction with the operating system. One or more of client-side SIP processes 12, 14, 16, 18 and server-side SIP process 10 may interface with each other (via network 22 and/or network 26).

Users 44, 46, 48, 50 may access server-side SIP process 10 directly through the device on which the client-side SIP process (e.g., client-side SIP processes 12, 14, 16, 18) is executed, namely client electronic devices 28, 30, 32, 34, for example. Users 44, 46, 48, 50 may access server-side SIP process 10 directly through network 22 and/or through secondary network 26. Further, server computer 20 (i.e., the computer that executes server-side SIP process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Screen Information Protection Process

For the following discussion, server-side SIP process 10 will be described for illustrative purposes. It should be noted that a client-side SIP process (e.g., one or more of client-side SIP process 12, 14, 16, 18) may be incorporated into server-side SIP process 10 and may be executed within one or more applications that allow for communication with a client-side SIP process (e.g., client-side SIP process 12). However, this is not intended to be a limitation of this disclosure, as other configurations are possible (e.g., stand-alone, client-side SIP processes and/or stand-alone server-side SIP processes.) For example, some implementations may include one or more of client-side SIP processes 14, 16, 18 in place of or in addition to client-side SIP process 12.

Referring now to FIGS. 1-4, a user (e.g., one or more of users 44, 46, 48, 50) may desire to protect information and/or data on a computer screen (e.g., computer screen 400) which may be associated with a client electronic device (e.g., one or more of client electronic devices 28, 30, 32, 34). For example, user 44 may wish to obfuscate the information and/or data so that an individual may not be able to view the information and/or data when near computer screen 400. The term "obfuscate" as used herein may refer to blurring, blotching, masking, or otherwise blocking the information and/or data from being viewed. Obfuscating may be accomplished by covering the information and/or data with solid rectangles (e.g., black rectangles) to prevent the information and/or data from being viewed.

In another example, user 46 may wish to obfuscate the information and/or data in order to provide a screenshot of computer screen 400. In other words, there may be non-public information on computer screen 400 that a user (e.g., user 44 and/or user 46) may wish to prevent other people from seeing, either physically on computer screen 400, or via a screenshot of computer screen 400. Users 44 and/or 46 may wish to protect one or more of a desktop, an email message, a bookmark, a web browser tab, an image, a spreadsheet, a document, and/or text that may appear on computer screen 400 when physically visible to others, or when visible via a screenshot.

Figure 4:
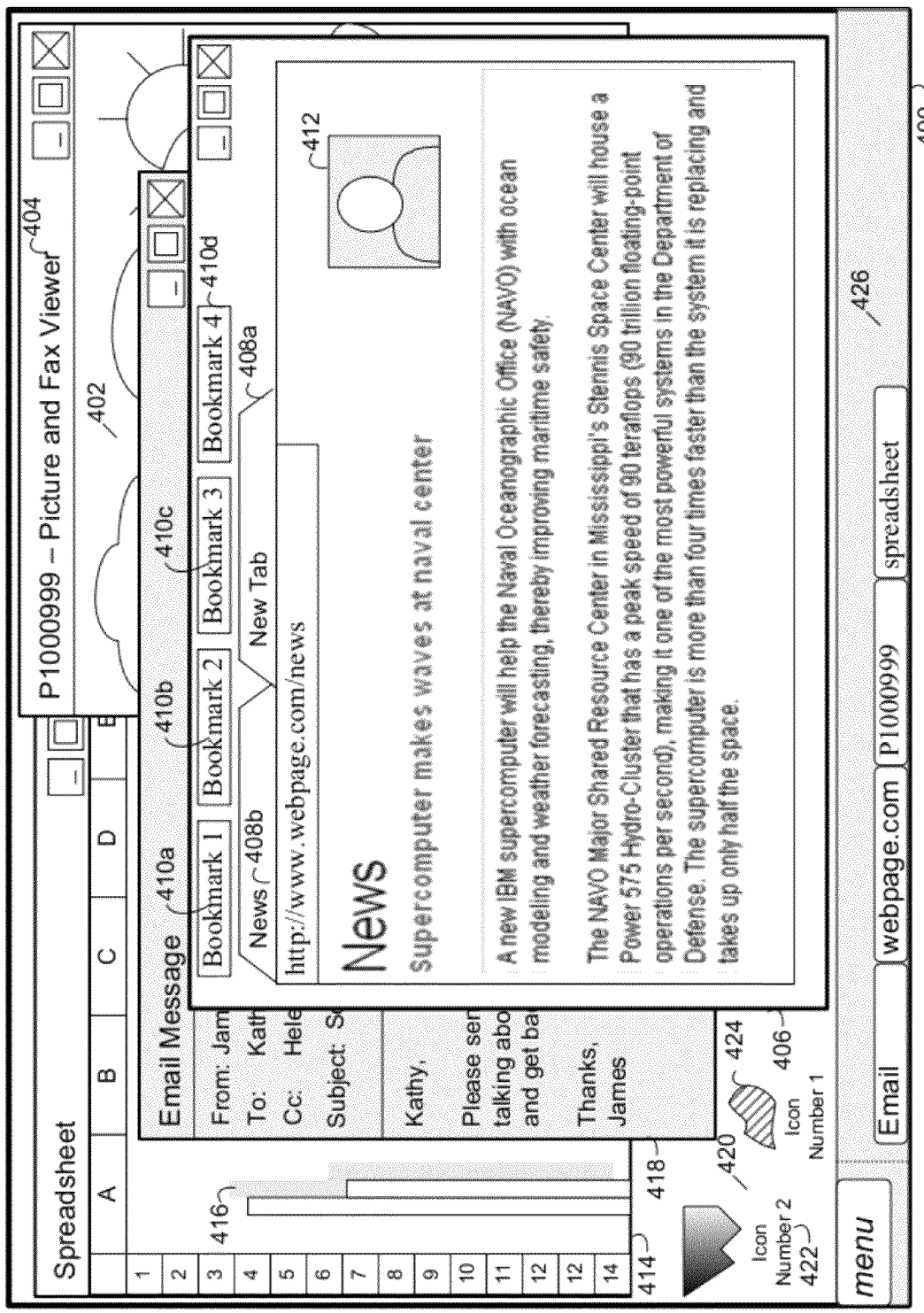
FIG. 4 is an exemplary computer screen which may be associated with the screen information protection process of FIG. 1.

Referring now to FIGS. 2-4, SIP process 12 may determine 100 if there is a screen protection rule (e.g., process rule 302 and/or application rule 304). The screen protection rule may be based upon, at least in part, at least one of an application rule (e.g., application rule 304) for protecting a portion (e.g., portion 408) of a screen region (e.g., screen region 406), and a process rule (e.g., process rule 302) for protecting the portion (e.g., portion 408a and/or 408b) of the screen region (e.g., screen region 406). Portions 408a and/or 408b may be, for example, tabs on a web browser viewed on a computer screen (e.g., computer screen 400). The screen region (e.g., screen region 406) may be (118) a window. For example, screen region 406 may be a window associated with the web browser. SIP process 12 may further modify 102 the portion (e.g., portions 408a and/or 408b) of the screen region (e.g., screen region 406) based upon, at least in part, at least one of the application rule (e.g., application rule 304), and the process rule (e.g., process rule 302). The modifying may be done at an operating system level, an application level, or by communicating with one or more applications. An application rule (e.g., application rule 304) may be supported by an application running on a client electronic device (e.g., one or more of client electronics devices 28, 30, 32, and 34) that may interface with computer screen 400. A process rule (e.g., process rule 304) may be supported by an operating system application running on a client electronic device (e.g., one or more of client electronics devices 28, 30, 32, and 34) that may interface with computer screen 400.

At least one of the determining 100 if there is a screen protection rule (e.g., process rule 302 and/or application rule 304), and the modifying 102 the portion (e.g., portions 408a and/or 408b) of the screen region (e.g., screen region 406), may be performed (106) in response to a request for a screenshot. For example, user 44 may utilize a print screen function available on an operating system that may allow user 44 to take a screenshot image of computer screen 400. Alternatively, at least one of the determining 100 if there is a screen protection rule (e.g., process rule 302 and/or application rule 304), and the modifying 102 the portion (e.g., portions 408a and/or 408b) of the screen region (e.g., screen region 406), may be performed in response to a request by user 44 to protect information on computer screen 400. For example, user 44 may be a manager and may wish to show computer screen 400 to an employee, but may not want protected information to be displayed to the employee. User 44 may invoke a program, keystroke, and/or hotkey in order to initiate SIP process 12 in connection with computer screen 400 to protect information on computer screen 400 from being viewed by the employee.

SIP process 12 may determine 104 if one or more screen regions (e.g., one or more of screen regions 402, 406, 414, 418, 420, and 426) are visible via computer screen 400. One or more of screen regions 402, 406, 414, 418, 420, and 426 may be windows. For example, and as discussed above, screen region 406 may be a window associated with a web browser. Screen region 402 may be a window associated with a picture and fax viewing application. Screen region 414 may be a window associated with a spreadsheet application. Screen region 418 may be a window associated with an email application, and may be, for example, an email message. While various screen regions of computer screen 400 are discussed herein as being windows, this is for exemplary purposes only, as a screen region may be any region of computer screen 400. For example, screen region 420 may be a visible desktop region, and screen region 426 may be a visible taskbar region.

In an implementation, in response to a request for a screenshot, SIP process 12 may determine a location and/or size of each screen region (e.g., window in the illustrated example) that may be part of the screenshot. SIP process 12 may do so by retrieving a list of all windows, their locations and/or sizes, as well as their z-order on the computer screen. SIP process 12 may use this information to determine which portions and/or screen regions of which applications are exposed on the screenshot.

For example, assume for illustrative purposes that SIP process 12 determines 104 that screen region 418 (e.g., an email message window) is visible via computer screen 400. Referring now to FIG. 3, SIP process 12 determine 100 (e.g., by querying database 300) if there is a screen protection rule (e.g., process rule 302 and/or application rule 304) corresponding to an email application associated with screen region 418. SIP process 12 may match an application's process name, path, message digest algorithm and/or other information with that of an application in database 300. If an application matches, one or more rules for that application may be used. Database 300 may include a number of application rules and/or process rules which may be used in connection with SIP process 12 to protect screen information.

Figure 5:
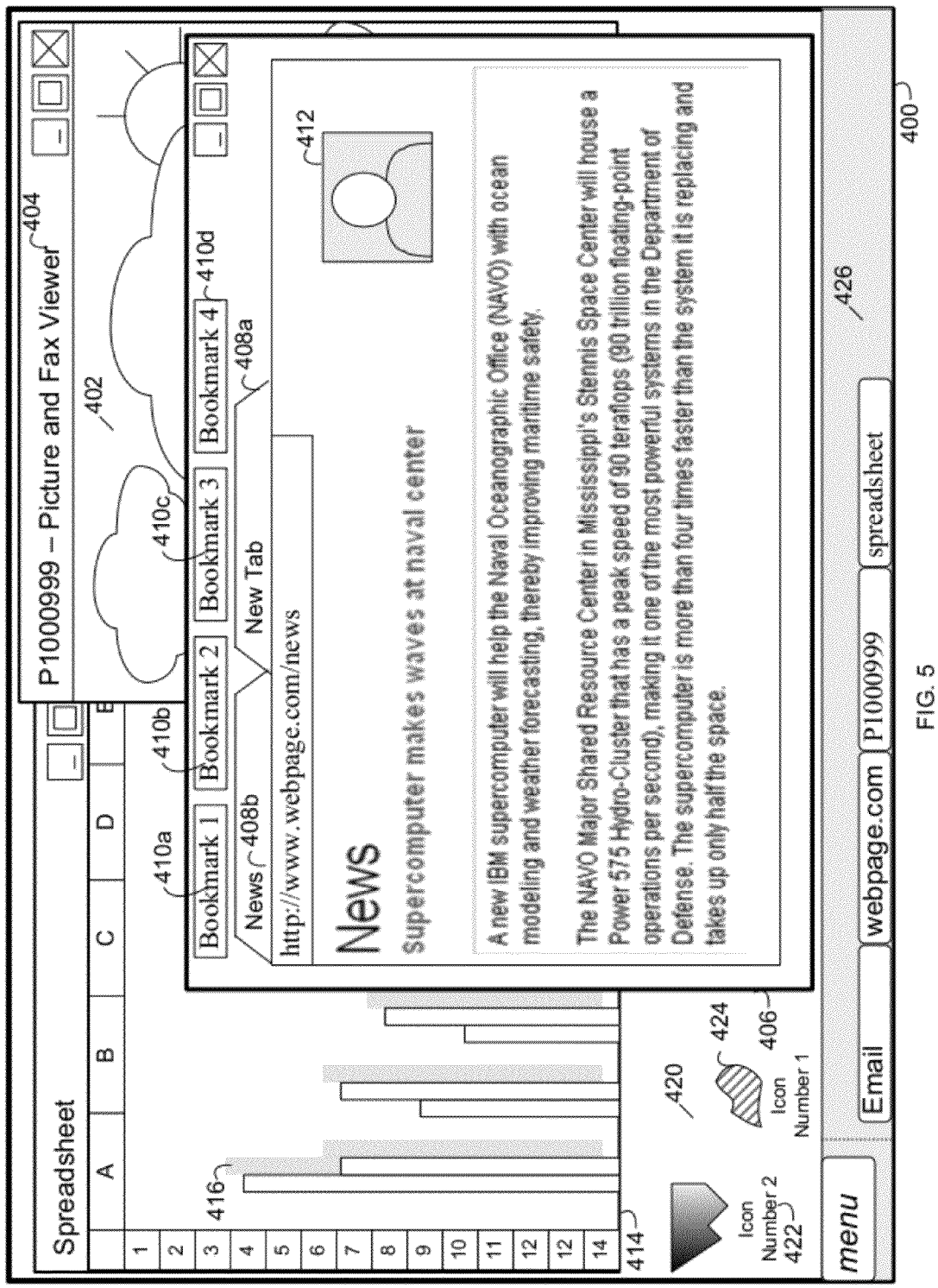
FIG. 5 is an exemplary computer screen which may be associated with the screen information protection process of FIG. 1.

SIP process 12 may find process rule 302 in database 300 corresponding to the email application, which may be to minimize the email message window (e.g., screen region 418). Referring now FIG. 5, SIP process 12 may modify 102 the email message window (e.g., screen region 418), by minimizing 120 the email message window (i.e., screen region 418). As shown in FIG. 5, the email message window (e.g., screen region 418) may be minimized 120 in response to a request by user 44 for a screenshot. SIP process 12 may minimize 120 the email message window (e.g., screen region 418) via an application programming interface (API), a Send- Message command, and/or an X mechanism that may be associated with the application and/or operating system.

In an implementation, one or more tags may exist in an application and may designate what information is private and/or public. Further, an element and/or object in an application may have an attribute set that may designate the element and/or object as private and/or public, e.g., with respect to SIP process 12. SIP process 12 may also use pattern matching in connection with an application rule to obfuscate any information, text, and/or other data that matches a certain pattern. For example, social security numbers may have a fixed number of digits (e.g., nine digits) and may take the form of ###-##-####. Further, telephone numbers may have a fixed number of digits, (e.g., ten digits), and may take the form of ###-###-####. SIP process 12 may be configured to match such patterns visible on computer screen 400 and obfuscate corresponding information, text, and/or other data that matches such patterns. For example, SIP process 12 may determine the bounding box of a matched string (e.g., x-digit number) and/or a text area object, and then obfuscate the string and/or text area object via black rectangles.

Assume for illustrative purposes that SIP process 12 may determine 104 that screen region 406 (e.g., a web browser window) is visible via computer screen 400. Referring now to FIG. 3, SIP process 12 may determine 100 (e.g., by querying database 300) if there is a screen protection rule (e.g., process rule 302 and/or application rule 304) corresponding to a web browser application associated with the web browser window (e.g., screen region 406). SIP process 12 may find application rule 304 corresponding to the web browser application, which may be to regenerate the web browser window (e.g., screen region 406) without one or more bookmarks (e.g., one or more of portions 410*a*-410*d* of screen region 406) being visible. Further, SIP process 12 may also find one more of application rule 306 and/or process rule 308 which may correspond to the web browser application. Application rule 306 may be to regenerate the web browser window (e.g., screen region 406) without one or more web browser tabs (e.g., one or more of portions 408*a* and 408*b* of screen region 406) being visible. Process rule 308 may be to obfuscate one or more images (e.g., portion 412 of screen region 406) visible in the web browser window (i.e., screen region 406).

Figure 6:
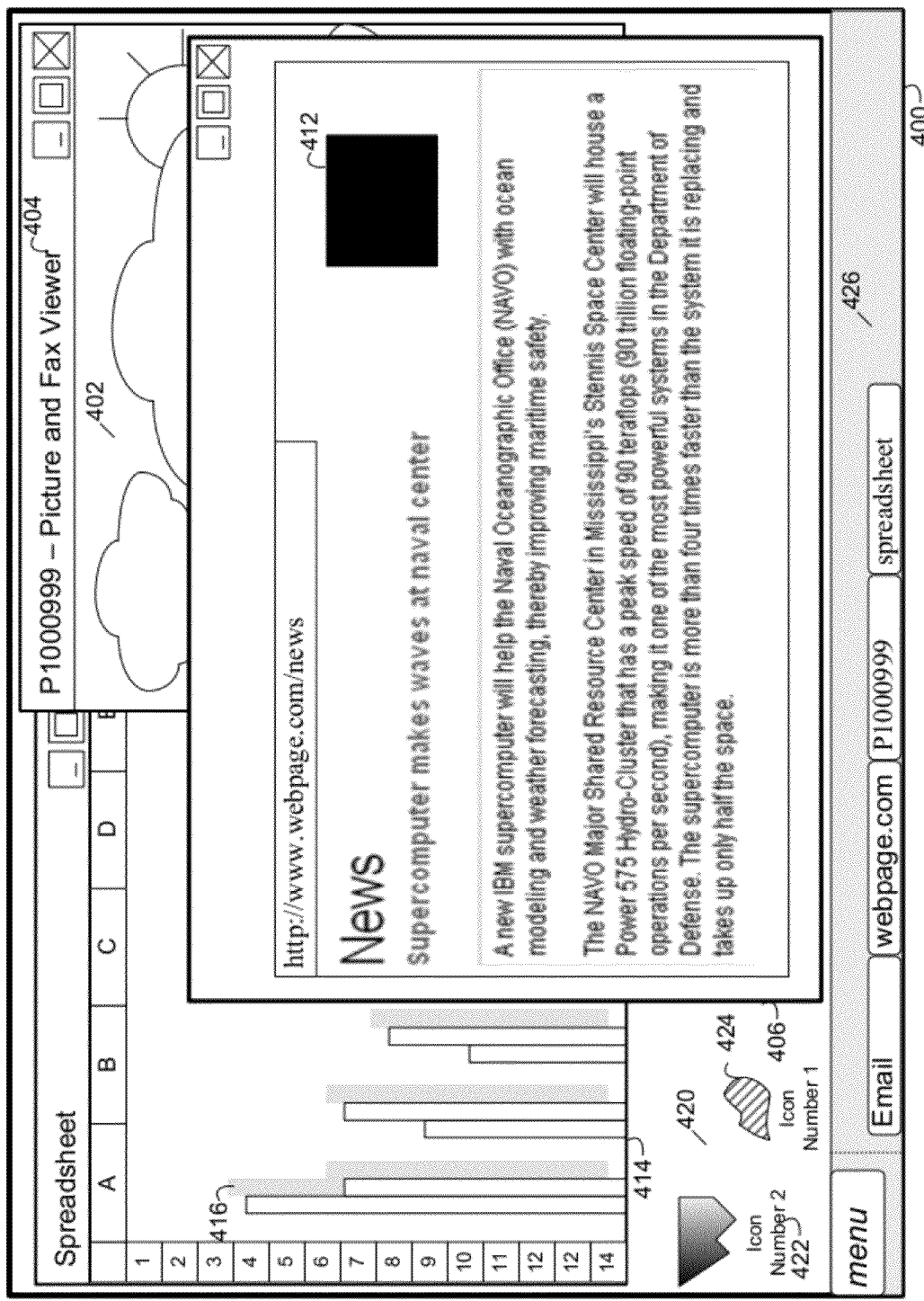
FIG. 6 is an exemplary computer screen which may be associated with the screen information protection process of FIG. 1.

Referring now to FIG. 6, SIP process 12 may modify 102 the web browser window (e.g., screen region 406), by regenerating 108 the web browser window (e.g., screen region 406) based upon, at least in part, application rule 304. As shown in FIG. 6, the web browser window (e.g., screen region 406) may be regenerated 108, in response to a request by user 44 for a screenshot, without one or more bookmarks (e.g., one or more of portions 410*a*-410*d* of screen region 406) being visible. SIP process 12 may regenerate 108 the web browser window (e.g., screen region 406) via an API, a SendMessage command, and/or an X mechanism that may be associated with the application and/or operating system.

Continuing with the above example, SIP process 12 may modify 102 the web browser window (e.g., screen region 406), by regenerating 108 the web browser window (e.g., screen region 406) based upon, at least in part, application rule 306. As shown in FIG. 6, the web browser window (e.g., screen region 406) may be regenerated 108, in response to a request by user 44 for a screenshot, without web browser tabs (e.g., one or more of portions 408*a* and 408*b*) being visible. SIP process 12 may regenerate 108 the web browser window (e.g., screen region 406) via an API, a SendMessage command, and/or an X mechanism that may be associated with the application and/or operating system.

Further, SIP process 12 may modify 102 the web browser window (e.g., screen region 406), by obfuscating 112 one or more images (e.g., portion 412 of screen region 406) visible in the web browser window (e.g., screen region 406) based upon, at least in part, process rule 308. As shown in FIG. 6, portion 412 of screen region 406 (e.g., an image) may be obfuscated 112, in response to a request by user 44 for a screenshot, such that portion 412 of screen region 406 (e.g., an image) is not visible via computer screen 400. SIP process 12 may obfuscate 112 portion 412 of screen region 406 (e.g., an image) by determining a bounding box of portion 412 within the web browser window (e.g., screen region 406).

Figure 7:
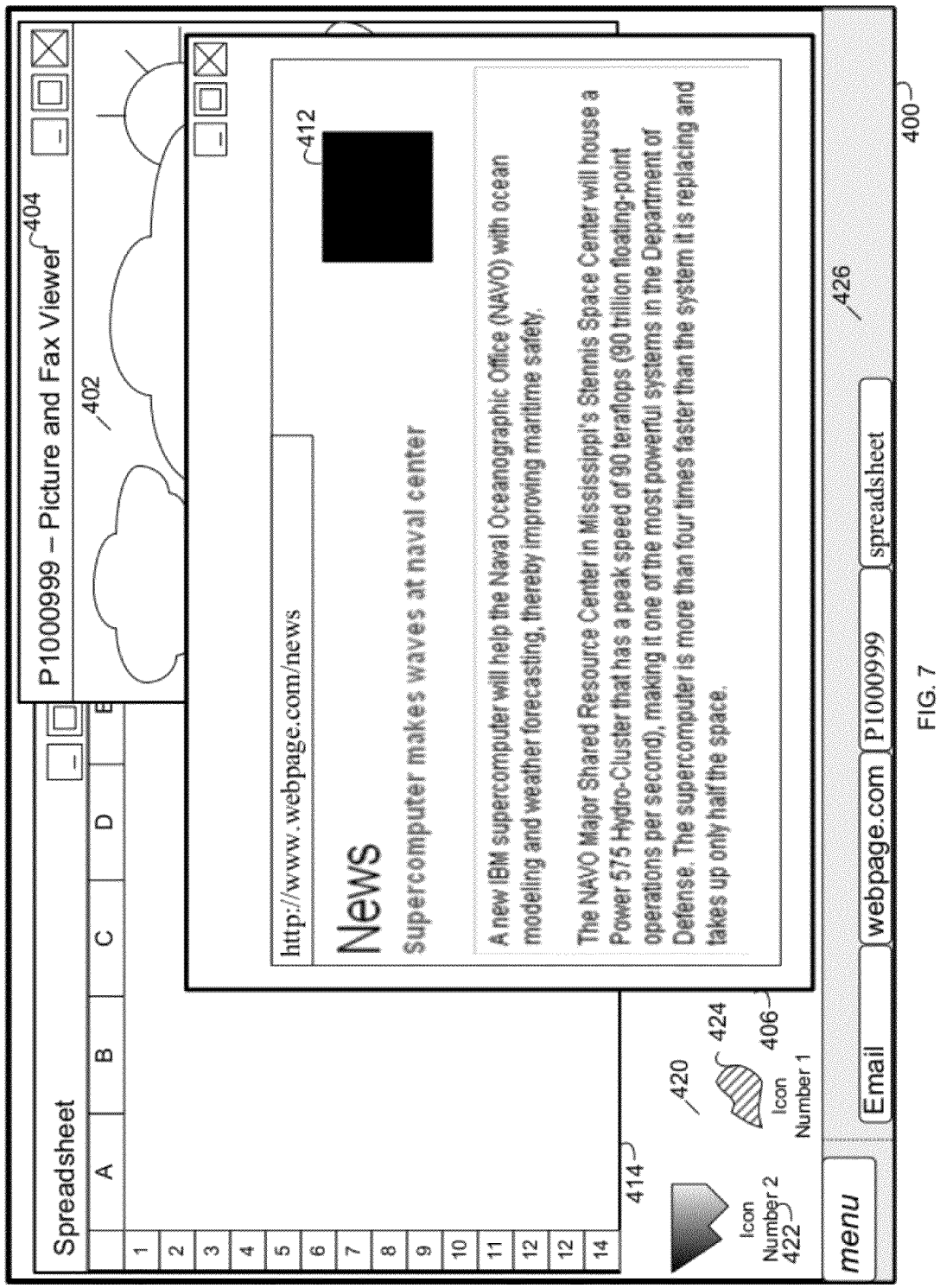
FIG. 7 is an exemplary computer screen which may be associated with the screen information protection process of FIG. 1.

Assume further, for exemplary purposes only, that SIP process 12 determines 104 that screen region 414 (e.g., a spreadsheet) is visible via computer screen 400. Referring now to FIG. 3, SIP process 12 may determine 100 (e.g., by querying database 300) if there is a screen protection rule (e.g., process rule 302 and/or application rule 304) corresponding to a spreadsheet application associated with screen region 414. SIP process 12 may find process rule 310 corresponding to the spreadsheet application, which may be to remove 114 an object (e.g., portion 416) of screen region 414 (e.g., the spreadsheet). Further, SIP process 12 may modify 102 the spreadsheet (e.g., screen region 414), by removing 114 one or more objects (e.g., portion 416 of screen region 414) visible in the spreadsheet (e.g., screen region 414) based upon, at least in part, process rule 310. As shown in FIG. 7, portion 416 of screen region 414 (e.g., an image) may be removed 114, in response to a request by user 44 for a screenshot. SIP process 12 may send 110 a request to the spreadsheet application associated with the spreadsheet (e.g., screen region 414) based upon, at least in part, process rule 310. The request may be sent 110 via a SendMessage and/or X mechanism and may be to remove one or more visible objects (e.g., portion 416) from the spreadsheet (e.g., screen region 414).

Figure 8:
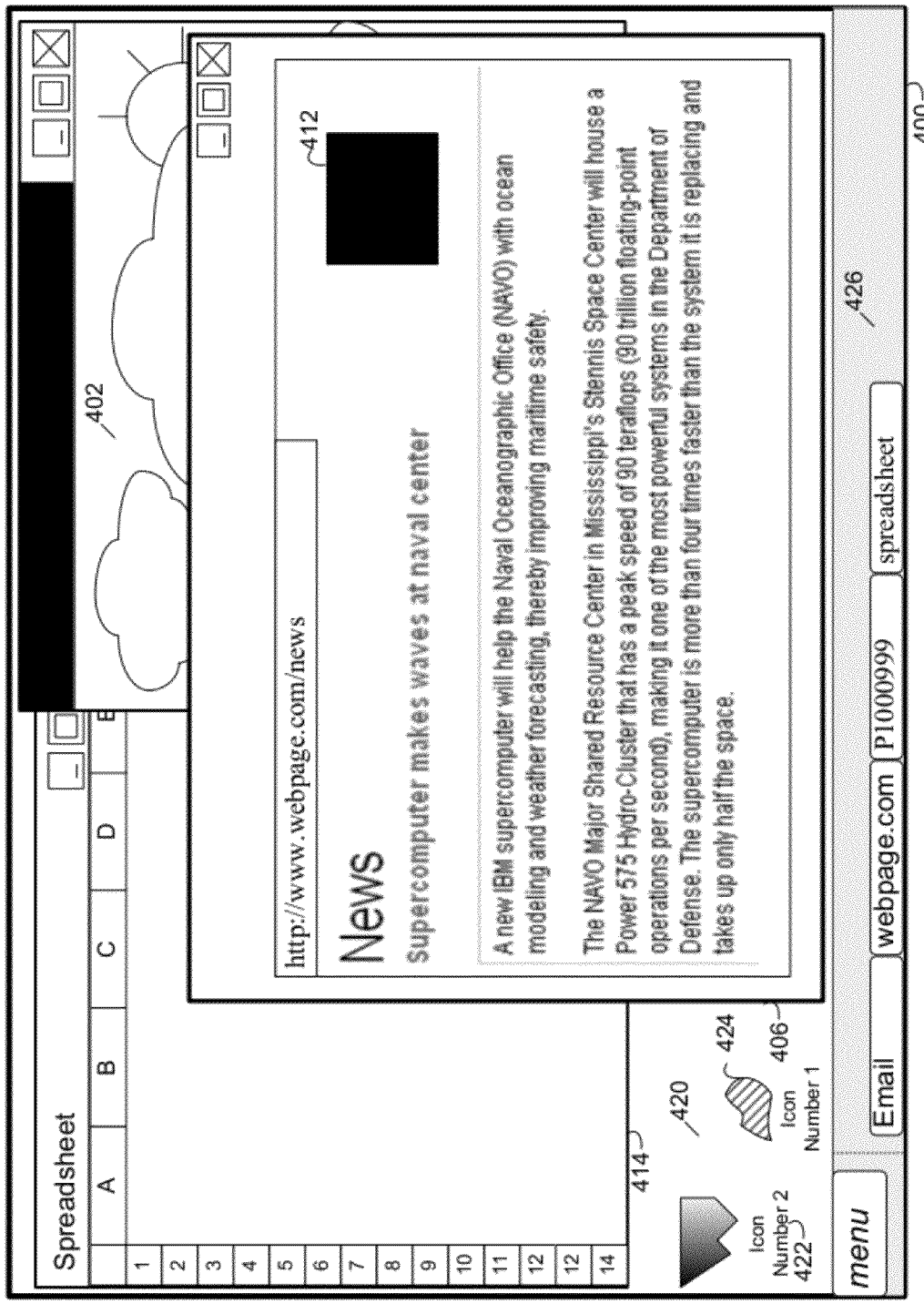
FIG. 8 is an exemplary computer screen which may be associated with the screen information protection process of FIG. 1.

SIP process 12 may further determine 104 that screen region 402 (e.g., a picture and fax viewer) is visible via computer screen 400. Referring now to FIG. 3, SIP process 12 may determine 100 (e.g., by querying database 300) if there is a screen protection rule (e.g., process rule 302 and/or application rule 304) corresponding to a picture and fax viewing application associated with screen region 402. SIP process 12 may find process rule 312 corresponding to the picture and fax viewing application, which may be to obfuscate 112 an image name (e.g., portion 404) of screen region 402 with a bounding box. As shown in FIG. 8, portion 404 of screen region 402 may be obfuscated 112, in response to a request by user 44 for a screenshot. SIP process 12 may send 110 a request to the picture and fax viewing application associated with screen region 402 based upon, at least in part, process rule 312. The request may be sent via a SendMessage and/or X mechanism and may be to obfuscate the image name (e.g., portion 404) of screen region 402 with a bounding box. For example, SIP process 12 may obfuscate a portion of a screen region by introspecting elements at an operating system level (e.g., by enumerating top level and non-top level windows by class name and/or text) or by using predefined regions such as rectangles to mask the portion.

Figure 9:
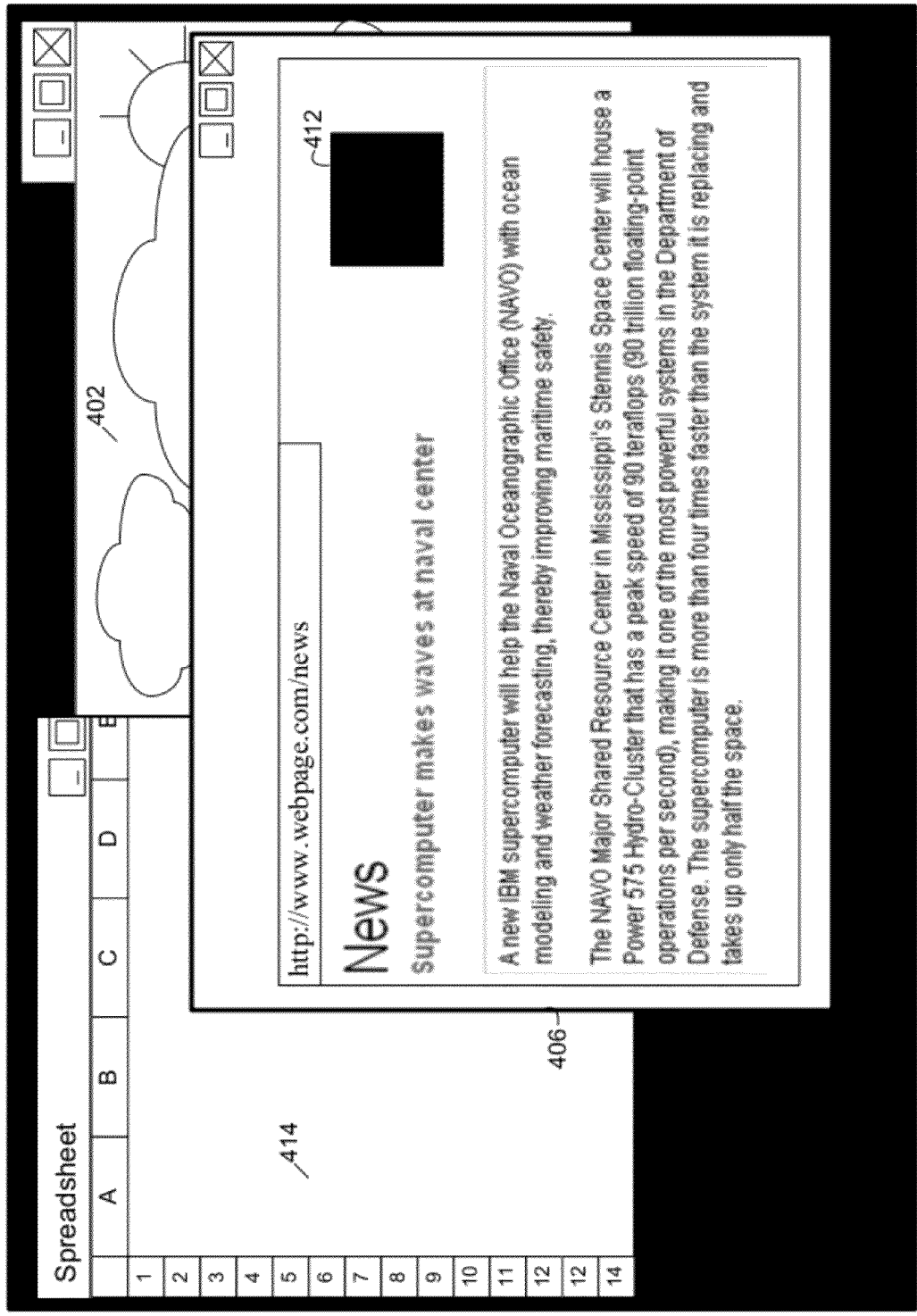
FIG. 9 is an exemplary computer screen which may be associated with the screen information protection process of FIG. 1.

In an implementation, SIP process 12 may determine 104 that screen region 420 (e.g., a desktop) is visible via computer screen 400. Referring now to FIG. 3, SIP process 12 may determine 100 (e.g., by querying database 300) if there is a screen protection rule (e.g., process rule 302 and/or application rule 304) corresponding to a desktop associated with screen region 420. SIP process 12 may find process rule 314 corresponding to the desktop, which may be to obfuscate 112 the visible desktop (e.g., portions 422 and/or 424) of screen region 420. Portion 422 and/or portion 424 of screen region 420 may be one or more desktop icons. As shown in FIG. 9, screen region 420, including one or more of portions 422 and/or 424, may be obfuscated 112, in response to a request by user 44 for a screenshot. SIP process 12 may calculate the visible desktop region using, for example, intersecting elements of the one or more screen regions on computer screen 400, based upon, at least in part, process rule 314.

Similarly, in an implementation, SIP process 12 may determine 104 that screen region 426 (e.g., a task bar) is visible via computer screen 400. Referring now to FIG. 3, SIP process 12 may determine 100 (e.g., by querying database 300) if there is a screen protection rule (e.g., process rule 302 and/or application rule 304) corresponding to a task bar associated with screen region 426. SIP process 12 may find process rule 316 corresponding to the task bar, which may be to obfuscate 112 the visible task bar. As shown in FIG. 9, screen region 426 may be obfuscated 112, in response to a request by user 44 for a screenshot. SIP process 12 may calculate the visible task bar region using, for example, intersecting elements of the one or more screen regions on computer screen 400, based upon, at least in part, process rule 316. In an implementation, SIP process 12 may be configured to crop out the obfuscated portion (e.g., the obfuscated task bar in FIG. 9) to ensure a size optimal screenshot. For example, the obfuscated (e.g., blacked-out) portions of computer screen 400, as shown around the edges of FIG. 9, may be removed in order to allow the visible screen regions remaining on computer screen 400 to optimally fit in the screenshot.

Figure 10:
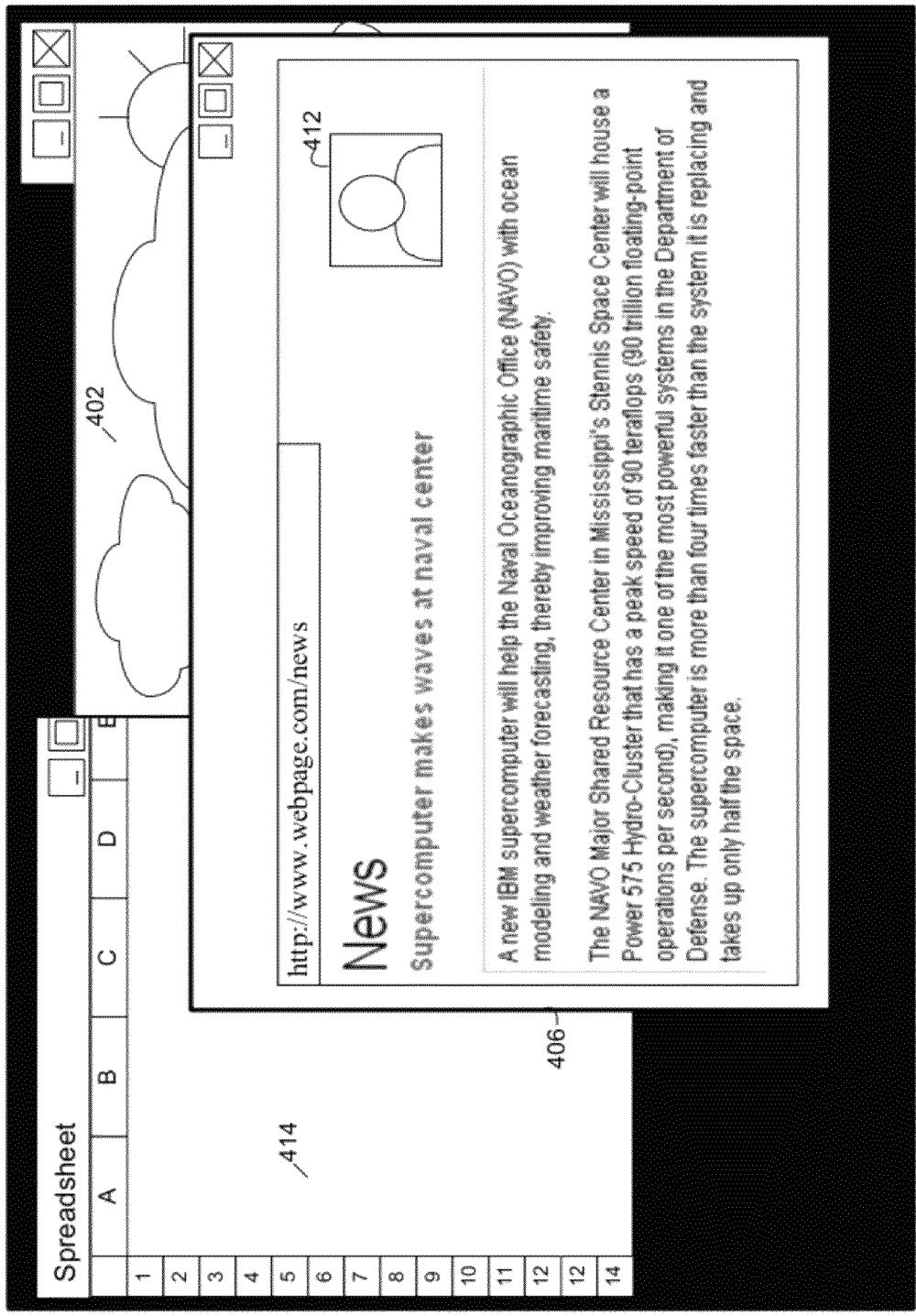
FIG. 10 is an exemplary computer screen which may be associated with the screen information protection process of FIG. 1.

Once SIP process 12 has enforced any screen protection rules related to content visible on computer screen 400, FIG. 9 may represent the one or more visible screen regions remaining on computer screen 400. A request for a screenshot by, e.g., user 44, may result in a screenshot image including the visible screen regions shown in FIG. 9. After the screenshot image is grabbed, user 44 may have an opportunity to override any of the screen protection rules that may have been enforced on computer screen 400 by SIP process 12. Assume, for example, that user 44 wishes for portion 412 of screen region 406 (e.g., an image that was obfuscated under process rule 308) to be visible in the screenshot of computer screen 400. As shown in FIG. 10, SIP process 12 may override process rule 308 and restore portion 412 of screen region 406 in response to a request from user 44. Further SIP process 12 may allow user 44 to make additional modifications such as blurring and/or removing contents, watermarking, etc. Also, once the screenshot image is grabbed, the original status of all the visible screen regions may be returned such that computer screen 400 is fully visible, as shown in FIG. 4.

In an implementation, SIP process 12 may define 116 at least one of the application rule (e.g., application rule 304), and the process rule (e.g., process rule 302). User 44 may create one or more rules in database 300 corresponding to various modifications that may be desired when taking screenshots. Further, SIP process 12 may learn one or more elements that are commonly obfuscated and may define rules for obfuscating those elements. For example, SIP process 12 may learn that open tabs in a web browser should be blurred when taking a screenshot, based upon, at least in part, one or more rules previously defined in database 300.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which, when executed by a processor, cause the processor to perform operations comprising:
    determining at least one of: an application running on a computing device and an operating system application running on the computing device;
    determining if there is a screen protection rule by querying a database, the screen protection rule based upon, at least in part, at least one of: an application rule for protecting a portion of a screen region associated with the application running on the computing device, and a process rule for protecting the portion of the screen region associated with the operating system application running on the computing device;
    determining if the screen protection rule applies to at least one of the application and the operating system application running on the computing device; and
    based upon the determination that the screen protection rule applies to the at least one of the application and the operating system application running on the computing device, modifying the portion of the screen region based upon, at least in part, at least one of: the application rule, and the process rule, wherein at least one of: the determining if there is a screen protection rule, and the modifying the portion of the screen region, is performed in response to a request for a screenshot;
    wherein different portions of the screen region are associated with different applications.

2. The computer program product of claim 1, further comprising instructions for:
    determining if the screen region is visible.

3. The computer program product of claim 1, wherein modifying the portion of the screen region further comprises:
    regenerating the screen region based upon, at least in part, the application rule, including regenerating a web browser window without at least one of: a web browser tab visible in the web browser window, a bookmark visible in the web browser window, and an image visible in the web browser window.

4. The computer program product of claim 1, wherein modifying the portion of the screen region further comprises:
    sending a request to the operating system application running on the computing device based upon, at least in part, the process rule.

5. The computer program product of claim 1, wherein modifying the portion of the screen region further comprises:
    obfuscating the portion of the screen region based upon, at least in part, the process rule.

6. The computer program product of claim 1, wherein modifying the portion of the screen region further comprises:
    removing an object from the screen region.

7. The computer program product of claim 1, further comprising instructions for:
    defining at least one of: the application rule, and the process rule.

8. The computer program product of claim 1, wherein the screen region is a window.

9. The computer program product of claim 8, wherein modifying the portion of the screen region further comprises:
    minimizing the window.

10. A computing system comprising:
    at least one processor;
    at least one memory architecture coupled with the at least one processor;
    a first software module executed on the at least one processor and the at least one memory architecture, wherein the first software module is configured to determine at least one of: an application running on a computing device and an operating system application running on the computing device;
    a second software module executed on the at least one processor and the at least one memory architecture, wherein the second software module is configured to determine if there is a screen protection rule by querying a database, the screen protection rule based upon, at least in part, at least one of: an application rule for protecting a portion of a screen region associated with the application running on the computing device, and a process rule for protecting the portion of the screen region associated with the operating system application running on the computing device;

a third software module executed on the at least one processor and the at least one memory architecture, wherein the third software module is configured to determine if the screen protection rule applies to at least one of the application and the operating system application running on the computing device; and a fourth software module executed on the at least one processor and the at least one memory architecture, wherein the fourth software module is configured to, based upon the determination that the screen protection rule applies to the at least one of the application and the operating system application running on the computing device, modify the portion of the screen region based upon, at least in part, at least one of: the application rule, and the process rule, wherein at least one of: the determining if there is a screen protection rule, and the modifying the portion of the screen region, is performed in response to a request for a screenshot;

wherein different portions of the screen region are associated with different applications.

11. The computing system of claim 10, further comprising:
a fifth software module executed on the at least one processor and the at least one memory architecture, wherein the fifth software module is configured to determine if the screen region is visible.

12. The computing system of claim 10, further comprising:
a sixth software module executed on the at least one processor and the at least one memory architecture, wherein the sixth software module is configured to regenerate the screen region based upon, at least in part, the application rule, including regenerating a web browser window without at least one of: a web browser tab visible in the web browser window, a bookmark visible in the web browser window, and an image visible in the web browser window.

13. The computing system of claim 10, wherein the fourth software module, configured to modify the portion of the screen region, is further configured to:
send a request to the operating system application running on the computing device based upon, at least in part, the process rule.

* * * * *